Oct. 28, 1958 A. R. GLOBUS 2,858,189
PRODUCTION OF TITANIUM TETRACHLORIDE
Filed Feb. 23, 1956
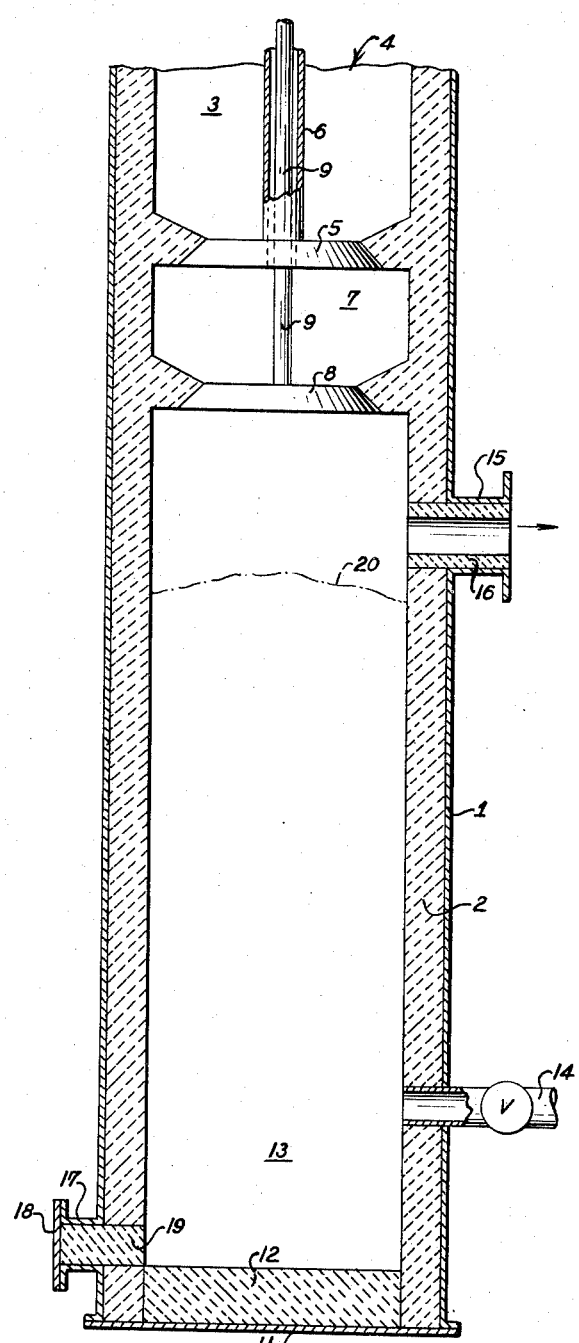
INVENTOR
ALFRED R. GLOBUS
BY Louis Burgess
ATTORNEY

United States Patent Office 2,858,189
Patented Oct. 28, 1958

2,858,189

PRODUCTION OF TITANIUM TETRACHLORIDE

Alfred R. Globus, Forest Hills, N. Y., assignor to United International Research, Inc., a corporation of New York Application February 23, 1956, Serial No. 567,095

6 Claims. (Cl. 23—87)

This invention relates to the production of titanium tetrachloride by reacting elemental chlorine with titanium metal in scrap form and will be fully understood from the following description read in conjunction with the drawing, which is a diagrammatic showing of apparatus in which the invention may be carried out.

The reaction of elemental chlorine with titanium metal takes place readily at a red heat and below the melting point of the metal. For this purpose the titanium metal in scrap form is treated with the chlorine in an apparatus of the type indicated in the figure. This includes steel shell 1 enclosing refractory lining 2. The upper end 3 of this lining forms hopper 4, the lower end of which is sealed by bell valve 5 operated through tube 6 by any suitable means (not shown). Immediately below hopper 4 is a second hopper 7, the lower end of which is sealed by bell valve 8 operated through rod 9 by suitable means (not shown). The lower end of shell 1 is sealed by transverse closure 11 carrying refractory lining 12. The space 13 within refractory lining 2 below bell valve 8 and above lining 12 is the reaction zone. Provision is made for the introduction of a gas to the lower end of this zone through valve pipe 14. Volatile products produced may be carried out through side outlet 15 provided with refractory lining 16 to suitable condensers (not shown). Any residue accumulating in the lower end of reaction zone 13 may be removed through side outlet 17 normally sealed by blank 18 and filled with a luting 19, of clay or similar refractory material.

In operation the reaction zone 13 is charged with titanium scrap to about the level indicated by line 20, prior to the introduction of chlorine through valved pipe 14. Since in normal practice the reaction proceeds only at temperatures of at least red heat, it has been necessary to either pre-heat the refractory lining 2 to an elevated temperature by firing the reaction zone 13 with gas and after ignition, purging it with an inert gas, for example argon, or alternatively pre-heating the titanium scrap to a temperature at which the reaction will spontaneously initiate itself. I have now discovered that this pre-heating is unnecessary if to the titanium scrap charge there is added a trace of a sub-chloride of titanium, either the di- or trichloride, or a mixture of the two. If this is added in even very small amounts to the titanium scrap, the reaction between the titanium and the chlorine will initiate itself and proceed spontaneously even at normal temperatures. Since the reaction is exothermic, the body of titanium scrap in the reaction zone will gradually come to a temperature of at least a bright red heat, at which the heat loss through lining 2 and that carried off in the volatile titanium tetrachloride produced will result in a temperature equilibrium.

Reaction in accordance with my invention is therefore carried out, as in the prior art, except that the titanium scrap is charged cold with the addition of a small amount of titanium di- or trichloride. Since it is desirable to initiate the reaction at the lower end of the reaction zone 13, this di- or trichloride is preferably added to the scrap first charged. In practice I have obtained entirely satisfactory results by the addition of 2–3 lbs. of titanium di- or trichloride to 100 lbs. of scrap. Even small amounts would give the desired result except that the reaction will be initiated over a smaller area and will therefore proceed more slowly in the initial stages. The function of the added di- or trichloride is of course catalytic since it is not one of the primary reactants and serves only to initiate the primary reaction. As soon as the temperature in the reaction zone reaches that at which the titanium tetrachloride is in vapor phase, the titanium tetrachloride theretofore produced will distill over into the condensers. Thereafter titanium tetrachloride will pass into the condensers in vapor phase as rapidly as it is generated in the reaction zone.

One especially valuable application of my invention is in the case in which it has been necessary, for any reason, to shut down the reactor and the titanium remaining in the reaction zone has cooled to a temperature below that at which the reaction would normally proceed. In this case additional scrap together with a small amount of a di- or trichloride of titanium is charged on top of the old scrap, following which the flow of chlorine is resumed. The reaction will start spontaneously in the scrap freshly charged and, as the temperature rises, will spread gradually down through the entire body of scrap in the reaction zone.

I claim:

1. In the production of titanium tetrachloride by reacting chlorine with titanium metal in scrap form, the step of initiating the reaction at temperatures below those at which it is normally self-initiating, by adding to the metallic titanium a small amount of a sub-chloride of titanium sufficient to initiate the exothermic reaction between the chlorine and titanium metal.

2. Process according to claim 1 in which the sub-chloride of titanium is the dichloride.

3. Process according to claim 1 in which the sub-chloride of titanium is the trichloride.

4. In the production of titanium tetrachloride by reacting chlorine with titanium metal in scrap form, the step of initiating the reaction at temperatures below those at which it is normally self-initiating, by adding to the metallic titanium catalytic amounts of a sub-chloride of titanium sufficient to initiate the exothermic reaction between the chlorine and titanium metal.

5. Process according to claim 4 in which the sub-chloride is the dichloride.

6. Process according to claim 4 in which the sub-chloride is the trichloride.

References Cited in the file of this patent

UNITED STATES PATENTS 2,670,270    Jordan ---------------- Feb. 23, 1954

OTHER REFERENCES

"Titanium," by Jelks Barksdale, 1949 ed., page 46. The Ronald Company, New York.